United States Patent
Lee

(10) Patent No.: US 11,292,309 B2
(45) Date of Patent: Apr. 5, 2022

(54) DAMPER CONTROL SYSTEM FOR VEHICLE

(71) Applicants: Hyundai Motor Company, Seoul (KR); Kia Motors Corporation, Seoul (KR)

(72) Inventor: Min Su Lee, Seongnam-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 469 days.

(21) Appl. No.: 16/414,606

(22) Filed: May 16, 2019

(65) Prior Publication Data

US 2020/0180382 A1    Jun. 11, 2020

(30) Foreign Application Priority Data

Dec. 10, 2018 (KR) .................. 10-2018-0158449

(51) Int. Cl.
*B60G 17/018* (2006.01)
*B60G 17/06* (2006.01)

(52) U.S. Cl.
CPC .......... *B60G 17/018* (2013.01); *B60G 17/06* (2013.01); *B60G 2400/102* (2013.01); *B60G 2500/10* (2013.01)

(58) Field of Classification Search
CPC ................. B60G 17/018; B60G 17/06; B60G 2400/102; B60G 2500/10
USPC ........................................................ 701/37
See application file for complete search history.

(56) References Cited

U.S. PATENT DOCUMENTS

| | | | |
|---|---|---|---|
| 9,987,899 B2* | 6/2018 | Yoon | B60G 17/01908 |
| 2005/0113997 A1* | 5/2005 | Kim | B60G 17/08 701/37 |
| 2006/0136107 A1* | 6/2006 | Kim | B60G 17/018 701/38 |
| 2017/0274724 A1* | 9/2017 | Liu | B60G 17/0165 |
| 2017/0297400 A1* | 10/2017 | Kubota | B60G 17/08 |
| 2019/0168563 A1* | 6/2019 | Barecke | B60G 17/08 |
| 2019/0351726 A1* | 11/2019 | Okimura | B60G 17/0195 |
| 2019/0381850 A1* | 12/2019 | Hoult | B60G 17/018 |
| 2020/0139781 A1* | 5/2020 | Goto | B60G 17/08 |
| 2020/0180591 A1* | 6/2020 | Choi | B60G 17/06 |

FOREIGN PATENT DOCUMENTS

| | | |
|---|---|---|
| KR | 10-2009-0094509 A | 9/2009 |
| KR | 10-0993168 B1 | 11/2010 |
| KR | 10-2018-0014599 A | 2/2018 |

* cited by examiner

*Primary Examiner* — Toan C To
(74) *Attorney, Agent, or Firm* — Morgan, Lewis & Bockius LLP

(57) ABSTRACT

A damper control system for a vehicle may include a damper-relative-velocity estimation module measuring a vertical acceleration of a vehicle body through a sensor mounted on the vehicle and estimating a damper velocity of a suspension based on the measured vertical acceleration, and a control module reducing movement of the vehicle body by actuating a damper using the damper velocity of the suspension estimated through the damper-relative-velocity estimation module.

16 Claims, 2 Drawing Sheets

DAMPER CONTROL SYSTEM FOR VEHICLE

CROSS REFERENCE TO RELATED APPLICATION

The present application claims priority of Korean Patent Application No. 10-2018-0158449 filed on Dec. 10, 2018, the entire contents of which is incorporated herein for all purposes by this reference.

BACKGROUND OF THE DISCLOSURE

Field of the Disclosure

The present invention relates to a damper control system for a vehicle. More particularly, it relates to a damper control system for a vehicle, which is directed to reduce the movement of a suspension.

Description of Related Art

Recently, an Electric Control Suspension (ECS) is used to control a damper depending on the relative velocity of the suspension, thus minimizing the vertical movement of a vehicle body (sprung mass) and improving a ride quality.

A conventional ECS includes four dampers providing a damping force between a vehicle body and a wheel, an ECU controlling the dampers, a vehicle-body sensor calculating the vertical velocity of the vehicle body, and a wheel sensor calculating the vertical velocity of the wheel.

In this regard, sensors are mounted on three corners out of four corners of the vehicle body and on two front wheels, thus requiring a total of five sensors.

However, the sensors mounted on the vehicle body and the wheel are expensive, and a weight is increased due to the mounted sensors, thus adversely affecting fuel efficiency.

Therefore, there is a demand for a new damper control method that can maintain the ride-quality improving effect of the ESC while reducing the number of sensors compared to the prior art.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a damper control system for a vehicle, which is configured for controlling a damper using a reduced number of sensors.

According to one aspect, there is provided a damper control system for a vehicle including a damper-relative-velocity estimation module measuring a vertical acceleration of a vehicle body through a sensor mounted on the vehicle, and estimating a damper velocity of a suspension based on the measured vertical acceleration; and a control module reducing movement of the vehicle body by actuating a damper using the damper velocity of the suspension estimated through the damper-relative-velocity estimation module.

The damper-relative-velocity estimation module may include a handling-situation determination module that receives steering information according to a steering angle or a steering angular velocity and compares the steering angle or the steering angular velocity with a preset limit value, wherein, if the steering angle or the steering angular velocity is equal to or less than the preset limit value, the handling-situation determination module may determine it as a non-handling situation to estimate the damper velocity of the suspension.

The handling-situation determination module may further receive information on a running velocity of the vehicle, and may determine whether or not the current condition is the non-handling situation when the running velocity exceeds a preset velocity.

When a roll rate and a pitch rate measured through the sensor disposed in the vehicle body exceed each boundary value, the handling-situation determination module may determine that a vehicle condition is abnormal and thereby the damper velocity of the suspension is not estimated.

The damper-relative-velocity estimation module may measure the vertical acceleration, the roll rate and the pitch rate through a 6D sensor, integrate the vertical acceleration to derive the vertical velocity, and then derive a gravity-center vertical velocity of the vehicle body using the roll rate and the pitch rate.

The damper-relative-velocity estimation module may measure the vertical acceleration using a body G sensor disposed in three sections out of four sections provided with wheels in the vehicle body.

The damper-relative-velocity estimation module may receive the vertical acceleration of the three sections out of the four sections of the vehicle body measured through the sensor, determine the gravity-center vertical velocity of the vehicle body, the roll rate and the pitch rate using the vertical acceleration of the three sections, and determine the vertical velocity of a remaining one section using the gravity-center vertical velocity of the vehicle body, the roll rate and the pitch rate.

The damper-relative-velocity estimation module may pass a value obtained by integrating the vertical acceleration of the three sections through a high pass filter to determine the vertical velocity.

The damper-relative-velocity estimation module may determine the gravity-center vertical velocity of the vehicle body using the following equations to determine the vertical acceleration of the three sections, $$v_{bz\_FL} = v_{cz\_est} + t1 \cdot \dot{\phi} - a \cdot \dot{\varphi}$$

$$v_{bz\_FR} = v_{cz\_est} - t1 \cdot \dot{\phi} - a \cdot \dot{\varphi}$$

$$v_{bz\_RL} = v_{cz\_est} + t2 \cdot \dot{\phi} + b \cdot \dot{\varphi}$$

$$v_{cz\_est} = 0.5 \cdot (v_{bz\_FL} + v_{bz\_FR} + 2 \cdot a \cdot \dot{\varphi})$$

where vbz_FL represents a vertical velocity [m/s] of a left front portion of the vehicle body, vbz_FR represents a vertical velocity [m/s] of a right front portion of the vehicle body, vbz_RL represents a vertical velocity [m/s] of a left rear portion of the vehicle body, vcz_est represents the gravity-center vertical velocity [m/s] of the vehicle body, a represents a front-axle tread [m], b represents a rear-axle tread [m], φ represents a roll angle [rad], and φ represents a pitch angle [rad].

The damper-relative-velocity estimation module may determine the roll rate and the pitch rate through the following equations using the vertical acceleration of the three sections while inducing the above equations, $$\dot{\phi}=-0.5/t1\cdot(v_{bz\_FL}-v_{bz\_FR})$$

$$\dot{\phi}=0.5/(a+b)\cdot(v_{bz\_FL}+v_{bz\_FR})-t2\cdot 0.5/(t1\cdot(a+b))\cdot(v_{bz\_FL}-v_{bz\_FR})+1/(a+b)\cdot v_{bz\_RL}$$

where t1 represents a front-wheel tread [m], and t2 represents a rear-wheel tread [m].

The damper-relative-velocity estimation module may determine the vertical velocity of a remaining one section through the following equation using the gravity-center vertical velocity of the vehicle body, the roll rate and the pitch rate.

$$v_{bz\_RR}=v_{cz\_est}-t2\cdot\dot{\phi}+b\cdot\dot{\phi}$$

where vbz_RR represents a vertical velocity [m/s] of a right rear portion of the vehicle body.

The damper-relative-velocity estimation module may determine the damper velocity of the suspension using the gravity-center vertical velocity of the vehicle body, the vertical velocity of each section of the four sections, and the pitch rate in a situation where the pitch rate occurs.

The damper-relative-velocity estimation module may determine the damper velocity of the suspension using the following vehicle behavior equation and suspension force equation, Vehicle Behavior Equation:

$$F_{frt}=m_s\cdot a_z-\frac{I_y\cdot\ddot{\phi}+a\cdot m_s\cdot a_z}{a+b} \quad F_{rr}=\frac{I_y\cdot\ddot{\phi}+a\cdot m_s\cdot a_z}{a+b}$$

Suspension Force Equation:

$$\frac{d}{dt}\begin{bmatrix}x_{frt}\\x_{rr}\end{bmatrix}=\begin{bmatrix}-\frac{k_{frt}}{b_{frt}} & 0\\ 0 & -\frac{k_{rr}}{b_{rr}}\end{bmatrix}\cdot\begin{bmatrix}x_{frt}\\x_{rr}\end{bmatrix}+\begin{bmatrix}\frac{1}{b_{frt}} & 0\\ 0 & \frac{1}{b_{rr}}\end{bmatrix}\cdot\begin{bmatrix}F_{frt}\\F_{rr}\end{bmatrix}$$

where Ffrt represents front-wheel suspension force (N), Frr represents rear-wheel suspension force (N), ms represents spring mass (kg), Iy represents pitch inertia (m/s), az represents the gravity-center vertical velocity (m/s) of the vehicle body, a represents a front-axle tread (m), b represents a rear-axle tread (m), xfrt represents a front-wheel suspension relative distance (m), xrr represents a rear-wheel suspension relative distance (m), kfrt represents a front-wheel suspension spring stiffness (N/m), krr represents a rear-wheel suspension spring stiffness (N/m), bfrt represents a front-wheel damping coefficient (Ns/m), and brr represents a rear-wheel damping coefficient (Ns/m).

In a situation where the pitch rate and the roll rate occur, the damper-relative-velocity estimation module may determine the damper velocity of the suspension using the gravity-center vertical velocity of the vehicle body, the vertical velocity of each section of the four sections, and the pitch rate.

The damper-relative-velocity estimation module may determine the damper velocity of the suspension using the following vehicle behavior equation and suspension force equation.

Vehicle Behavior Equation:

$$F_{z\_FL}=a_{bz\_FL}\cdot\frac{m_s}{4} \quad F_{z\_FR}=a_{bz\_FR}\cdot\frac{m_s}{4}$$

$$F_{z\_RL}=a_{bz\_RL}\cdot\frac{m_s}{4} \quad F_{z\_RR}=a_{bz\_RR}\cdot\frac{m_s}{4}$$

Suspension Force Equation:

$$F_{z\_FL}=k_{FL}\cdot x_{FL}+b_{FL}\cdot\dot{x}_{FL}$$

$$F_{z\_FR}=k_{FR}\cdot x_{FR}+b_{FR}\cdot\dot{x}_{FR}$$

$$F_{z\_RL}=k_{RL}\cdot x_{RL}+b_{RL}\cdot\dot{x}_{RL}$$

$$F_{z\_RR}=k_{RR}\cdot x_{RR}+b_{RR}\cdot\dot{x}_{RR}$$

where Fz_FL represents left front wheel suspension force, Fz_FR represents a right front wheel suspension force, Fz_RL represents a left rear wheel suspension force, Fz_RR represents a right rear wheel suspension force, az_FL represents a vertical velocity of the left front portion of the vehicle body, az_FR represents a vertical velocity of the right front portion of the vehicle body, az_RL represents a vertical velocity of the left rear portion of the vehicle body, az_RR represents a vertical velocity of the right rear portion of the vehicle body, KFL represents a spring stiffness of the left front portion (N/m), KFR represents a spring stiffness of the right front portion (N/m), KRL represents a spring stiffness of the left rear portion (N/m), KRR represents spring stiffness of the right rear portion (N/m), bFL represents a damping coefficient of the left front portion (Ns/m), bFR represents a damping coefficient of the right front portion (Ns/m), bRL represents a damping coefficient of the left rear portion (Ns/m), bRR represents a damping coefficient of the right rear portion (Ns/m), xFL represents a suspension relative distance of the left front portion (m), xFR represents a suspension relative distance of the right front portion (m), xRL represents a suspension relative distance of the left rear portion (m), and xRR represents a suspension relative distance of the right rear portion (m).

If the damper velocity of the suspension in a situation where the pitch rate occurs and the damper velocity of the suspension in a situation where the pitch rate and the roll rate occur are determined, the damper-relative-velocity estimation module may combine damper velocities of respective suspensions of the vehicle to tune the damper velocity of the suspension.

The damper-relative-velocity estimation module may tune the damper velocity of the suspension in a situation where the pitch rate occurs and the damper velocity of the suspension in a situation where the pitch rate and the roll rate occur, using the following equation, ε×(suspension in the situation where pitch rate occurs)+(1−ε)×(damper velocity of suspension in the situation where pitch rate and roll rate occur)=damper velocity of final suspension where E represents a tuning variable.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
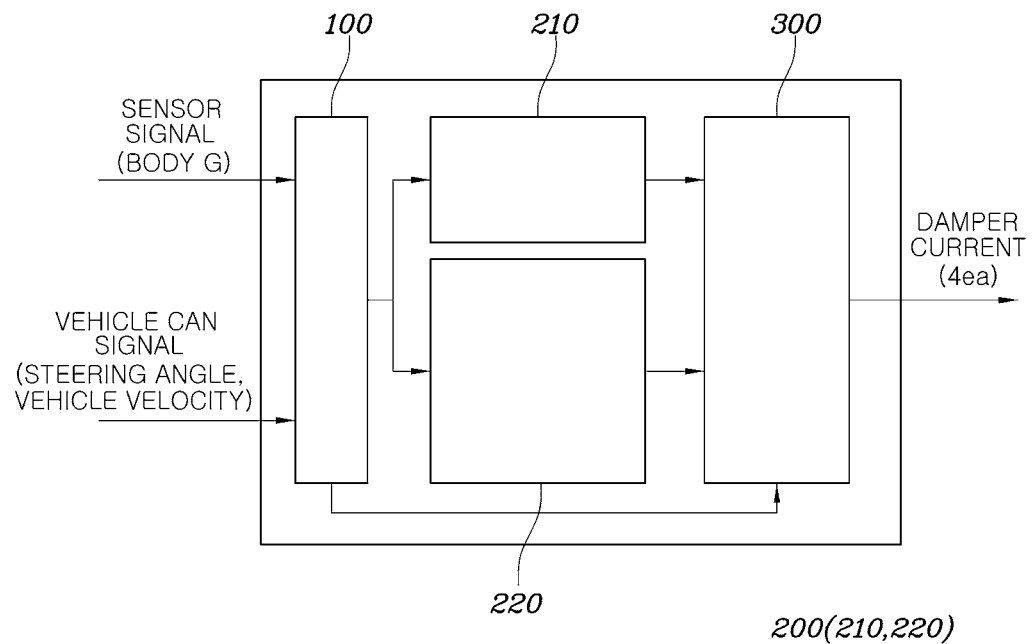
FIG. 1 is a schematic diagram illustrating a damper control system for a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE DISCLOSURE

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, a damper control system for a vehicle according to the exemplary embodiment of the present invention will be described with reference to the accompanying drawings.

Figure 2:
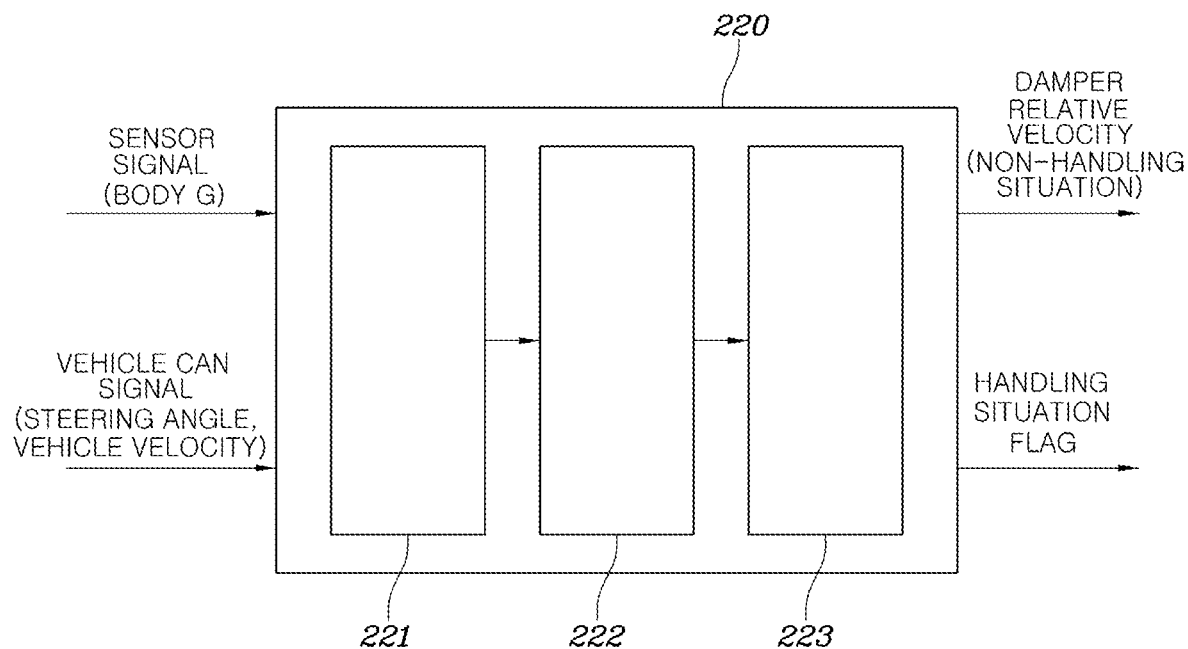
FIG. 2 is a schematic diagram illustrating a damper-relative-velocity estimation module of the damper control system for the vehicle illustrated in FIG. 1.
Figure 3:
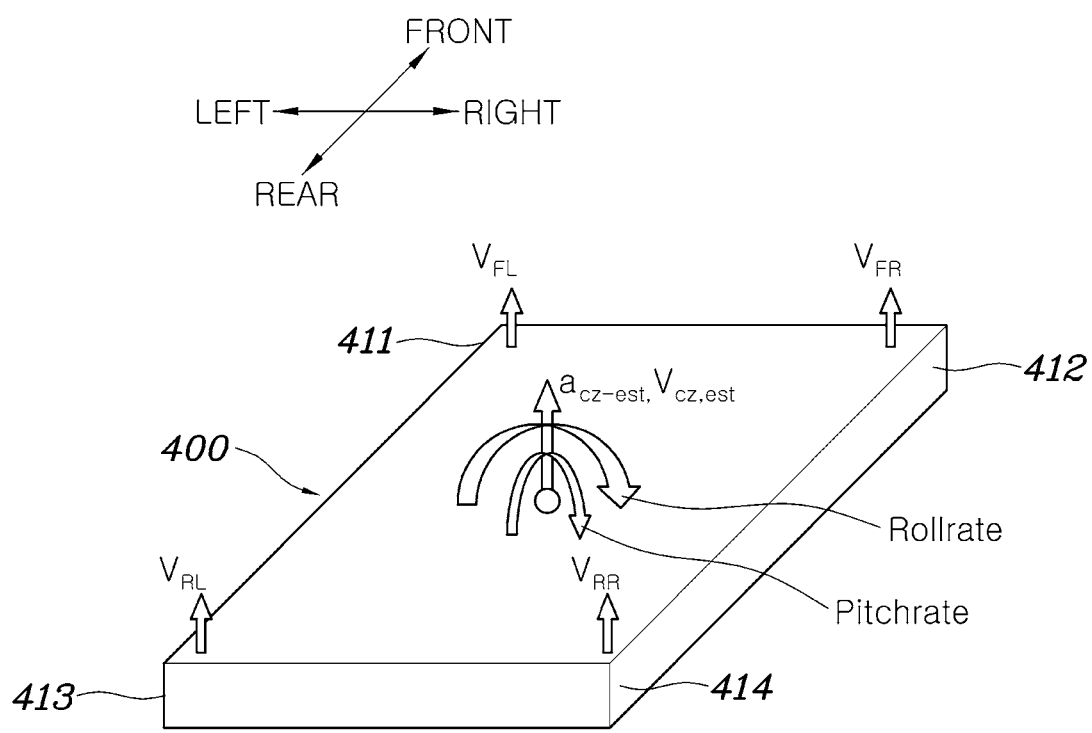
FIG. 3 is a view schematically illustrating a vehicle body and the kind of force acting on the vehicle body.

FIG. 1 is a schematic diagram illustrating a damper control system for a vehicle according to an exemplary embodiment of the present invention, FIG. 2 is a schematic diagram illustrating a damper-relative-velocity estimation module of the damper control system for the vehicle illustrated in FIG. 1, and FIG. 3 is a view schematically illustrating a vehicle body and the kind of force acting on the vehicle body.

As illustrated in FIG. 1, FIG. 2, and FIG. 3, the damper control system for the vehicle according to an exemplary embodiment of the present invention includes a damper-relative-velocity estimation module 220 that measures the vertical acceleration of the vehicle body through a sensor mounted on the vehicle and estimates the damper velocity of a suspension based on the measured vertical acceleration, and a control module 300 that reduces the movement of the vehicle body by actuating a damper using the damper velocity of the suspension estimated through the damper-relative-velocity estimation module 220.

That is, to control the damper of the suspension through an ECS, as illustrated in FIG. 1, the system of the present invention includes the damper-relative-velocity estimation module 220 that estimates the damper velocity of the suspension, and the control module 300 that actuates the damper at the estimated damper velocity of the suspension. Furthermore, the system may include a signal processing module 100 receives and transmits a steering angle, a vehicle velocity, and signals of various sensors, such as a body G sensor, to estimate the suspension damper velocity of the damper-relative-velocity estimation module 220. The system may further include a road-roughness estimation module 210 to control the damper. Here, as illustrated in FIG. 2, the damper-relative-velocity estimation module 220 may include a body-behavior determination module 221 to determine the vertical velocity of the vehicle body, a handling-situation determination module 222 to determine a turning movement, and a damper-relative-velocity determination module 223 to determine the damper relative velocity of the suspension. In the description of the present invention, they are integrated into the damper-relative-velocity estimation module 220.

Meanwhile, the sensor of the present invention may further include a velocity sensor to measure the running velocity of the vehicle, a steering-wheel sensor to measure a steering angle, and a body G sensor to detect both the roll rate and the pitch rate of the vehicle body. In the case of the body G sensor for estimating the vertical acceleration and the vertical velocity of the vehicle body, sensors may be disposed at four corners of the vehicle body. If the sensors are disposed at three corners, the vertical velocities and the vertical accelerations for the three corners are estimated and then combined, so that it is possible to estimate the vertical velocity and the vertical acceleration for a remaining corner. Therefore, the damper-relative-velocity estimation module 220 may determine the damper relative velocity of the suspension, and the control module 300 may receive the damper relative velocity of the suspension estimated through the damper-relative-velocity estimation module 220 to operate the damper and thereby reduce the movement of the vehicle body.

The present invention will be described in more detail. The damper-relative-velocity estimation module 220 includes a handling-situation determination module 222 that receives steering information according to a steering angle or a steering angular velocity and compares the steering angle or the steering angular velocity with a preset limit value. If the steering angle or the steering angular velocity is equal to or less than the preset limit value, the handling-situation determination module 222 determines it as the non-handling situation to estimate the damper velocity of the suspension. Here, the handling-situation determination module 222 may receive the steering information via the steering sensor. The limit value may be previously stored as a value at which the vehicle is turned based on the steering angle or the steering angular velocity upon manipulating a steering wheel.

If the steering angle or the steering angular velocity is equal to or less than the limit value, the handling-situation determination module 222 determines that the vehicle is not handled and turned. Thus, it is possible to estimate the damper velocity of the suspension via the damper-relative-velocity estimation module 220.

Furthermore, the handling-situation determination module 222 may further receive information on the running velocity of the vehicle, and may determine whether or not the current condition is the non-handling situation when the running velocity exceeds the preset velocity. Here, the preset velocity may be preset to determine whether or not the vehicle is driven. If the running velocity exceeds the preset velocity, the handling situation is determined and thereby a control operation is performed.

Furthermore, when a roll rate and a pitch rate measured via the sensor disposed in the vehicle body exceed each boundary value, the handling-situation determination module 222 determines that the vehicle condition of the vehicle is abnormal and thereby the damper velocity of the suspension is not estimated. Here, the boundary value is a preset value to determine whether or not the sensor for detecting the roll rate and the pitch rate is abnormal. If the roll rate and the pitch rate exceed the boundary value, it is determined that the vehicle condition is abnormal and thereby the damper velocity of the suspension is not determined by the damper-relative-velocity estimation module 220. Furthermore, a driver may be notified by lighting a warning message.

Accordingly, the handling-situation determination module 222 determines information on the running velocity, the steering angle, the roll rate and the pitch rate and confirms the non-handling situation of the vehicle, thus estimating the damper velocity of the suspension in the straight running situation of the vehicle under the non-handling situation.

Meanwhile, the damper-relative-velocity estimation module 220 may measure the vertical acceleration using the body G sensor disposed in three sections out of four sections provided with wheels in the vehicle body.

Although FIG. 3 shows that sensors 410 are disposed in all the four sections provided with the wheels in the vehicle body 400, the sensors 410 may be substantially disposed only in the three sections. As will be described in more detail below, it is possible to estimate vertical acceleration and vertical velocity of four sections, based on the vertical acceleration measured through the sensors disposed in the three sections out of the four sections in the vehicle body 400. The installation position of the sensor 410 is as follows: a left front sensor 411 and a right front sensor 412 may be disposed at both sides of a front portion, while either of a left rear sensor 413 or a right rear sensor 414 may be disposed at any one of both sides of a rear portion. The present invention is not limited thereto. That is, the left rear sensor 413 and the right rear sensor 414 may be disposed at both sides of the rear portion, while the left front sensor 411 or the right front sensor 412 may be disposed at any one of both sides of the front portion.

The damper-relative-velocity estimation module 220 may receive the vertical acceleration of the three sections out of the four sections of the vehicle body measured through the sensor, determine the gravity-center vertical velocity of the vehicle body, the roll rate and the pitch rate using the vertical acceleration of the three sections, and determine the vertical velocity of a remaining one section using the gravity-center vertical velocity of the vehicle body, the roll rate and the pitch rate.

As described above, the vertical acceleration is measured using the body G sensor 410 disposed in each of three sections selected out of the four sections of the vehicle body 400, the measured vertical acceleration is integrated and the vertical velocity is determined, and then a vertical velocity value passes through a high pass filter to eliminate an error, thus determining a final vertical velocity.

The high pass filter is configured to passes signals with a frequency higher than a predetermined cutoff frequency.

To determine the vertical velocity of the section where no sensor is disposed, a damper-relative-velocity estimation module may determine the gravity-center vertical velocity of the vehicle body using the following equations to determine the vertical acceleration of the three sections.

$$v_{bz\_FL}=v_{cz\_est}+t1\cdot\dot{\phi}-a\cdot\dot{\varphi}$$

$$v_{bz\_FR}=v_{cz\_est}-t1\cdot\dot{\phi}-a\cdot\dot{\varphi}$$

$$v_{bz\_RL}=v_{cz\_est}+t2\cdot\dot{\phi}+b\cdot\dot{\varphi}$$

$$v_{cz\_est}=0.5\cdot(v_{bz\_FL}+v_{bz\_FR}+2\cdot a\cdot\dot{\varphi})$$

where vbz_FL represents the vertical velocity [m/s] of the left front portion of the vehicle body, vbz_FR represents the vertical velocity [m/s] of the right front portion of the vehicle body, vbz_RL represents the vertical velocity [m/s] of the left rear portion of the vehicle body, vcz_est represents the gravity-center vertical velocity [m/s] of the vehicle body, a represents a front-axle tread [m], b represents a rear-axle tread [m], $\phi$ represents a roll angle [rad], and $\varphi$ represents a pitch angle [rad].

In this regard, the damper-relative-velocity estimation module may determine the roll rate and the pitch rate through the following equations using the vertical acceleration of the three sections while inducing the above equations.

$$\dot{\phi}=-0.5/t1\cdot(v_{bz\_FL}-v_{bz\_FR})$$

$$\dot{\varphi}=0.5/(a+b)\cdot(v_{bz\_FL}+v_{bz\_FR})-t2\cdot 0.5/(t1\cdot(a+b))\cdot(v_{bz\_FL}-v_{bz\_FR})+1/(a+b)\cdot v_{bz\_RL}$$

where t1 represents a front-wheel tread [m], and t2 represents a rear-wheel tread [m].

Thus, the damper-relative-velocity estimation module may determine the vertical velocity of a remaining one section through the following equation using the gravity-center vertical velocity of the vehicle body, the roll rate and the pitch rate.

$$v_{bz\_RR}=v_{cz\_est}-t2\cdot\dot{\phi}+b\cdot\dot{\varphi}$$

where vbz_RR represents the vertical velocity [m/s] of the right rear portion of the vehicle body.

That is, using the above equation determining vbz_FL, vbz_FR and vbz_RL, the following equation may be induced $v_{bz\_FL}+v_{bz\_FR}=2\cdot v_{cz\_est}-2\cdot a\cdot\dot{\varphi}$. Using the associated equation, it is possible to induce an equation for deriving the gravity-center vertical velocity of the vehicle body.

Furthermore, by inducing the equation for determining vbz_FL, vbz_FR and vbz_RL, the following equation is induced $v_{bz\_FL}-v_{bz\_FR}=-2\cdot t1\cdot\dot{\phi}$. Using the associated equation, it is possible to induce a roll velocity. By inducing the following equation, $v_{bz\_RL}=0.5\cdot(v_{bz\_FL}+v_{bz\_FR}+2\cdot a\cdot\dot{\varphi})-t2\cdot 0.5/t1\cdot(v_{bz\_FL}-v_{bz\_FR})+b\cdot\dot{\varphi}$, it is possible to derive a pitch velocity.

Accordingly, by deriving the vertical velocity of the remaining one section through the body G sensor disposed in the three sections out of the four sections of the vehicle body, it is possible to derive the vertical velocity for all sections of the vehicle body.

Meanwhile, the damper-relative-velocity estimation module 220 measures the vertical acceleration, the roll rate and the pitch rate through a 6D sensor, integrates the vertical acceleration to derive the vertical velocity, and then derives the gravity-center vertical velocity of the vehicle body using the roll rate and the pitch rate. In this regard, as the 6D sensor basically outputs the roll rate and the pitch rate, the vertical velocity of the vehicle body for each section may be derived.

This is equal to equation for determining the vertical velocity of the vehicle body, which is as follows.

$$v_{bz\_FL}=v_{cz\_est}+t1\cdot\dot{\phi}-a\cdot\dot{\varphi}$$

$$v_{bz\_FR}=v_{cz\_est}-t1\cdot\dot{\phi}-a\cdot\dot{\varphi}$$

$$v_{bz\_RL}=v_{cz\_est}+t2\cdot\dot{\phi}+b\cdot\dot{\varphi}$$

$$v_{bz\_RR}=v_{cz\_est}-t2\cdot\dot{\phi}+b\cdot\dot{\varphi}$$

If the vertical velocity for all the sections of the vehicle body is determined, the damper velocity of the suspension is determined.

When the vehicle is driving, there may be a situation where the pitch rate occurs or a situation where both the pitch rate and the roll rate occur. Thus, the estimation equation varies depending on each situation when the damper velocity of the suspension is estimated.

That is, in a situation where the pitch rate occurs, the damper-relative-velocity estimation module 220 may determine the damper velocity of the suspension using the gravity-center vertical velocity of the vehicle body, the vertical velocity of each section of the four sections, and the pitch rate. To the present end, the damper-relative-velocity estimation module 220 may determine the damper velocity of the suspension using the following vehicle behavior equation and suspension force equation.

Vehicle Behavior Equation:

$$F_{frt} = m_s \cdot a_z - \frac{I_y \cdot \ddot{\varphi} + a \cdot m_s \cdot a_z}{a+b} \quad F_{rr} = \frac{I_y \cdot \ddot{\varphi} + a \cdot m_s \cdot a_z}{a+b}$$

Suspension Force Equation:

$$\frac{d}{dt}\begin{bmatrix} x_{frt} \\ x_{rr} \end{bmatrix} = \begin{bmatrix} -\frac{k_{frt}}{b_{frt}} & 0 \\ 0 & -\frac{k_{rr}}{b_{rr}} \end{bmatrix} \cdot \begin{bmatrix} x_{frt} \\ x_{rr} \end{bmatrix} + \begin{bmatrix} \frac{1}{b_{frt}} & 0 \\ 0 & \frac{1}{b_{rr}} \end{bmatrix} \cdot \begin{bmatrix} F_{frt} \\ F_{rr} \end{bmatrix}$$

where Ffrt represents front-wheel suspension force (N), Frr represents rear-wheel suspension force (N), ms represents spring mass (kg), Iy represents pitch inertia (m/s), az represents the gravity-center vertical velocity (m/s) of the vehicle body, a represents a front-axle tread (m), b represents a rear-axle tread (m), xfrt represents a front-wheel suspension relative distance (m), xrr represents a rear-wheel suspension relative distance (m), kfrt represents a front-wheel suspension spring stiffness (N/m), krr represents a rear-wheel suspension spring stiffness (N/m), bfrt represents a front-wheel damping coefficient (Ns/m), and brr represents a rear-wheel damping coefficient (Ns/m).

That is, if the pitch rate occurs, the damper velocity of the suspension is determined through a model as the vehicle moves in the pitch direction thereof. The vehicle behavior equation may be induced from equations: $m_s \cdot a_z = F_{frt} + F_{rr}$ and $I_y \cdot \ddot{\varphi} = -a \cdot F_{frt} + b \cdot F_{rr}$, and the suspension force equation may be induced from equations $F_{frt} = k_{frt} \cdot x_{frt} + b_{frt} \cdot \dot{x}_{frt}$ and $F_{rr} = k_{rr} \cdot x_{rr} + b_{rr} \cdot \dot{x}_{rr}$. The vehicle behavior equation and the suspension force equation are previously designed, and a differential equation is determined, thus deriving the damper relative velocity of the front/rear wheel. At the instant time, the vehicle is driving straight in the non-handling situation. Thus, it is assumed that the damper relative velocity of the left wheel is equal to that of the right wheel.

Meanwhile, in a situation where the pitch rate and the roll rate occur, the damper-relative-velocity estimation module may determine the damper velocity of the suspension using the gravity-center vertical velocity of the vehicle body, the vertical velocity of each section of the four sections, and the pitch rate. That is, if the damper relative velocity of the left wheel is different from that of the right wheel, the pitch rate as well as the roll rate is present, so that the damper velocity of the suspension may be determined using the following vehicle behavior equation and suspension force equation.

Vehicle Behavior Equation:

$$F_{z\_FL} = a_{bz\_FL} \cdot \frac{m_s}{4} \quad F_{z\_FR} = a_{bz\_FR} \cdot \frac{m_s}{4}$$

$$F_{z\_RL} = a_{bz\_RL} \cdot \frac{m_s}{4} \quad F_{z\_RR} = a_{bz\_RR} \cdot \frac{m_s}{4}$$

Suspension Force Equation:

$$F_{z\_FL} = k_{FL} \cdot x_{FL} + b_{FL} \cdot \dot{x}_{FL}$$

$$F_{z\_FR} = k_{FR} \cdot x_{FR} + b_{FR} \cdot \dot{x}_{FR}$$

$$F_{z\_RL} = k_{RL} \cdot x_{RL} + b_{RL} \cdot \dot{x}_{RL}$$

$$F_{z\_RR} = k_{RR} \cdot x_{RR} + b_{RR} \cdot \dot{x}_{RR}$$

where Fz_FL, represents left front wheel suspension force, $Fz_{FR}$ represents a right front wheel suspension force, $Fz_{RL}$ represents a left rear wheel suspension force, $Fz_{RR}$ represents a right rear wheel suspension force, $az_{FL}$, represents the vertical velocity of the left front portion of the vehicle body, $az_{FR}$ represents the vertical velocity of the right front portion of the vehicle body, $az_{RL}$ represents the vertical velocity of the left rear portion of the vehicle body, $az_{RR}$ represents the vertical velocity of the right rear portion of the vehicle body, Kim represents a spring stiffness of the left front portion (N/m), $K_{FR}$ represents a spring stiffness of the right front portion (N/m), $K_{RL}$ represents a spring stiffness of the left rear portion (N/m), $K_{RR}$ represents spring stiffness of the right rear portion (N/m), $b_{FL}$ represents a damping coefficient of the left front portion (Ns/m), $b_{FR}$ represents a damping coefficient of the right front portion (Ns/m), $b_{RL}$ represents a damping coefficient of the left rear portion (Ns/m), $b_{RR}$ represents a damping coefficient of the right rear portion (Ns/m), $x_{FL}$ represents a suspension relative distance of the left front portion (m), $x_{FR}$ represents a suspension relative distance of the right front portion (m), $x_{RL}$ represents a suspension relative distance of the left rear portion (m), and $x_{RR}$ represents a suspension relative distance of the right rear portion (m).

That is, if both the pitch rate and the roll rate occur, the damper velocity of the suspension is determined according to a model where the vehicle moves in both the pitch direction and the roll direction thereof. The vehicle behavior equation may derive the following equation by differentiating the vertical velocity determination equation of the vehicle body, $vb_{z\_FL}$, $vb_{z\_FR}$, $vb_{z\_RL}$ and $vb_{z\_RR}$.

$$a_{bz\_FL} = a_{cz\_est} + t1 \cdot \ddot{\varphi} - a \cdot \ddot{\varphi}$$

$$a_{bz\_FR} = a_{cz\_est} - t1 \cdot \ddot{\varphi} - a \cdot \ddot{\varphi}$$

$$a_{bz\_RL} = a_{cz\_est} + t2 \cdot \ddot{\varphi} + b \cdot \ddot{\varphi}$$

$$a_{bz\_RR} = a_{cz\_est} - t2 \cdot \ddot{\varphi} + b \cdot \ddot{\varphi}$$

where $ab_{z\_FL}$, $ab_{z\_FR}$, $ab_{z\_RL}$ and $ab_{z\_RR}$ represent the vertical acceleration of respective sections, and acz_est represents the gravity-center vertical acceleration of the vehicle body. Based on these values, it is possible to induce the vehicle behavior equation. Thus, the damper velocity of the suspension for each section may be derived using the suspension force equation.

If the damper velocity of the suspension in a situation where the pitch rate occurs and the damper velocity of the suspension in a situation where the pitch rate and the roll rate occur are determined, the damper-relative-velocity estimation module 220 combines damper velocities of respective suspensions of the vehicle to tune the damper velocity of the suspension. That is, although the ECS may be controlled using the damper velocity of the suspension in a situation where the pitch rate occurs and the damper velocity of the suspension in a situation where the pitch rate and the roll rate occur, the accurate damper relative velocity of the suspension may be finally derived for four corners by combining the damper velocities of the respective suspensions.

To the present end, the damper-relative-velocity estimation module 220 may tune the damper velocity of the suspension in a situation where the pitch rate occurs and the damper velocity of the suspension in a situation where the pitch rate and the roll rate occur, using the following equation.

$$\varepsilon \times (\text{suspension in the situation where pitch rate occurs}) + (1-\varepsilon) \times (\text{damper velocity of suspension in the situation where pitch rate and roll rate occur}) = \text{damper velocity of final suspension} \quad \text{equation:}$$

where $\varepsilon$ represents a tuning variable.

Here, $\varepsilon$ is a numerical value between 0 and 1. If $\varepsilon$ is equal to 0, only the damper velocity of the suspension in a situation where the pitch rate and the roll rate occur may be used. Meanwhile, if $\varepsilon$ is equal to 1, only the damper velocity of the suspension in a situation where the pitch rate occurs may be used. Furthermore, if $\varepsilon$ is any numerical value between 0 and 1, the damper velocity of the suspension in a situation where the pitch rate occurs or the damper velocity of the suspension in a situation where the pitch rate and the roll rate occur may be weighted and combined depending on the value of $\varepsilon$.

Accordingly, by deriving the damper velocities of the suspension for respective situations and then combining and tuning the damper velocities, it is possible to derive the accurate damper velocity of the suspension optimized for the control of the ECS, and to eliminate the wheel G sensor by deriving the above-described damper velocity, thus leading to a reduction in material cost.

As described above, various aspects of the present invention provide a damper control system for a vehicle, which is configured for effectively controlling a damper while reducing the number of sensors compared to the related art.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A damper control system for a vehicle, the damper control system comprising:
   a damper-relative-velocity estimation module measuring a vertical acceleration of a vehicle body through a sensor mounted on the vehicle, and estimating a damper velocity of a suspension based on the measured vertical acceleration; and
   a control module reducing movement of the vehicle body by actuating a damper using the damper velocity of the suspension estimated through the damper-relative-velocity estimation module,
   wherein the damper-relative-velocity estimation module includes a handling-situation determination module that receives steering information according to a steering angle or a steering angular velocity and compares the steering angle or the steering angular velocity with a predetermined limit value, and
   wherein, when the steering angle or the steering angular velocity is equal to or less than the predetermined limit value, the handling-situation determination module determines a current condition of the vehicle as a non-handling situation to estimate the damper velocity of the suspension.

2. The damper control system according to claim 1, wherein the handling-situation determination module further receives information on a running velocity of the vehicle, and determines when the current condition is the non-handling situation while the running velocity exceeds a predetermined velocity.

3. The damper control system according to claim 1, wherein, when a roll rate and a pitch rate measured through the sensor mounted in the vehicle body exceed each boundary value, the handling-situation determination module determines that a vehicle condition is abnormal and thereby the damper velocity of the suspension is not estimated.

4. The damper control system according to claim 1, wherein the damper-relative-velocity estimation module measures the vertical acceleration, a roll rate and a pitch rate through a 6D sensor, integrates the vertical acceleration to derive a vertical velocity, and then derives a gravity-center vertical velocity of the vehicle body using the roll rate and the pitch rate.

5. The damper control system according to claim 1, wherein the damper-relative-velocity estimation module measures the vertical acceleration using a body G sensor mounted in three sections out of four sections provided with wheels in the vehicle body.

6. The damper control system according to claim 5, wherein the damper-relative-velocity estimation module receives the vertical acceleration of the three sections out of the four sections of the vehicle body measured through the sensor, determines a gravity-center vertical velocity of the vehicle body, a roll rate and a pitch rate using the vertical acceleration of the three sections, and determines a vertical velocity of a remaining one section using the gravity-center vertical velocity of the vehicle body, the roll rate and the pitch rate.

7. The damper control system according to claim 6, wherein the damper-relative-velocity estimation module passes a value obtained by integrating the vertical acceleration of the three sections through a high pass filter to determine the vertical velocity.

8. The damper control system according to claim 6, wherein the damper-relative-velocity estimation module determines the gravity-center vertical velocity of the vehicle body using the following equations to determine the vertical acceleration of the three sections, $$v_{bz\_FL} = v_{cz\_est} + t1\cdot\dot{\phi} - a\cdot\dot{\varphi}$$

$$v_{bz\_FR} = v_{cz\_est} - t1\cdot\dot{\phi} - a\cdot\dot{\varphi}$$

$$v_{bz\_RL} = v_{cz\_est} + t2\cdot\dot{\phi} + b\cdot\dot{\varphi}$$

$$v_{cz\_est} = 0.5\cdot(v_{bz\_FL} + v_{bz\_FR} + 2\cdot a\cdot\dot{\varphi})$$

where vbz_FL represents a vertical velocity of a left front portion of the vehicle body, vbz_FR represents a vertical velocity of a right front portion of the vehicle body, vbz_RL represents a vertical velocity of a left rear portion of the vehicle body, vcz_est represents the gravity-center vertical velocity of the vehicle body, a represents a front-axle tread, b represents a rear-axle tread, φ represents a roll angle, and φ represents a pitch angle.

9. The damper control system according to claim 8, wherein the damper-relative-velocity estimation module determines the roll rate and the pitch rate through the following equations using the vertical acceleration of the three sections, $$\dot{\phi} = -0.5/t1\cdot(v_{bz\_FL} - v_{bz\_FR})$$

$$\dot{\varphi} = 0.5/(a+b)\cdot(v_{bz\_FL} + v_{bz\_FR}) - t2\cdot 0.5/(t1\cdot(a+b))\cdot(v_{bz\_FL} - v_{bz\_FR}) + 1/(a+b)\cdot v_{bz\_RL}$$

where t1 represents a front-wheel tread, and t2 represents a rear-wheel tread.

10. The damper control system according to claim 9, wherein the damper-relative-velocity estimation module determines the vertical velocity of a remaining one section through the following equation using the gravity-center vertical velocity of the vehicle body, the roll rate and the pitch rate, $$v_{bz\_RR} = v_{cz\_est} - t2\cdot\dot{\phi} + b\cdot\dot{\varphi}$$

where vbz_RR represents a vertical velocity of a right rear portion of the vehicle body.

11. The damper control system according to claim 8, wherein the damper-relative-velocity estimation module determines the damper velocity of the suspension using the gravity-center vertical velocity of the vehicle body, the vertical velocity of each section of the four sections, and the pitch rate in a situation where the pitch rate occurs.

12. The damper control system according to claim 11, wherein the damper-relative-velocity estimation module determines the damper velocity of the suspension using the following vehicle behavior equation and suspension force equation, wherein the vehicle behavior equation is:

$$F_{frt} = m_s\cdot a_z - \frac{I_y\cdot\ddot{\varphi} + a\cdot m_s\cdot a_z}{a+b} \quad F_{rr} = \frac{I_y\cdot\ddot{\varphi} + a\cdot m_s\cdot a_z}{a+b}$$

wherein the suspension force equation is:

$$\frac{d}{dt}\begin{bmatrix}x_{frt}\\x_{rr}\end{bmatrix} = \begin{bmatrix}-\frac{k_{frt}}{b_{frt}} & 0 \\ 0 & -\frac{k_{rr}}{b_{rr}}\end{bmatrix}\cdot\begin{bmatrix}x_{frt}\\x_{rr}\end{bmatrix} + \begin{bmatrix}\frac{1}{b_{frt}} & 0 \\ 0 & \frac{1}{b_{rr}}\end{bmatrix}\cdot\begin{bmatrix}F_{frt}\\F_{rr}\end{bmatrix}$$

where Ffrt represents front-wheel suspension force, Frr represents rear-wheel suspension force, $m_s$ represents spring mass, $I_y$ represents pitch inertia, $a_z$ represents the gravity-center vertical velocity of the vehicle body, a represents a front-axle tread, b represents a rear-axle tread, $x_{frt}$ represents a front-wheel suspension relative distance, $x_{rr}$ represents a rear-wheel suspension relative distance, $k_{frt}$ represents a front-wheel suspension spring stiffness, $k_{rr}$ represents a rear-wheel suspension spring stiffness, $b_{frt}$ represents a front-wheel damping coefficient, and $b_{rr}$ represents a rear-wheel damping coefficient.

13. The damper control system according to claim 11, wherein, in a situation where the pitch rate and the roll rate occur, the damper-relative-velocity estimation module determines the damper velocity of the suspension using the gravity-center vertical velocity of the vehicle body, the vertical velocity of each section of the four sections, and the pitch rate.

14. The damper control system according to claim 13, wherein the damper-relative-velocity estimation module determines the damper velocity of the suspension using the following vehicle behavior equation and suspension force equation, wherein the vehicle behavior equation is:

$$F_{z\_FL} = a_{bz\_FL}\cdot\frac{m_s}{4} \quad F_{z\_FR} = a_{bz\_FR}\cdot\frac{m_s}{4}$$

$$F_{z\_RL} = a_{bz\_RL}\cdot\frac{m_s}{4} \quad F_{z\_RR} = a_{bz\_RR}\cdot\frac{m_s}{4}$$

wherein the suspension force equation is:

$$F_{z\_FL} = k_{FL}\cdot x_{FL} + b_{FL}\cdot\dot{x}_{FL}$$

$$F_{z\_FR} = k_{FR}\cdot x_{FR} + b_{FR}\cdot\dot{x}_{FR}$$

$$F_{z\_RL} = k_{RL}\cdot x_{RL} + b_{RL}\cdot\dot{x}_{RL}$$

$$F_{z\_RR} = k_{RR}\cdot x_{RR} + b_{RR}\cdot\dot{x}_{RR}$$

where Fz_FL represents left front wheel suspension force, Fz_FR represents a right front wheel suspension force, Fz_RL represents a left rear wheel suspension force, Fz_RR represents a right rear wheel suspension force, az_FL represents a vertical velocity of the left front portion of the vehicle body, az_FR represents a vertical velocity of the right front portion of the vehicle body, az_RL represents a vertical velocity of the left rear portion of the vehicle body, az_RR represents a vertical velocity of the right rear portion of the vehicle body, $K_{FL}$ represents a spring stiffness of the left front portion, $K_{FR}$ represents a spring stiffness of the right front portion, $K_{RL}$ represents a spring stiffness of the left rear portion, $K_{RR}$ represents a spring stiffness of the right rear portion, $b_{FL}$ represents a damping coefficient of the left front portion, $b_{FR}$ represents a damping coefficient of the right front portion, $b_{RL}$ represents a damping coefficient of the left rear portion, $b_{RR}$ represents a damping coefficient of the right rear portion, $x_{FL}$ represents a suspension relative distance of the left front portion, $x_{FR}$ represents a suspension relative distance of the right front portion, $x_{RL}$ represents a suspension relative distance of the left rear portion, and $x_{RR}$ represents a suspension relative distance of the right rear portion.

15. The damper control system according to claim 13, wherein, when the damper velocity of the suspension in a situation where the pitch rate occurs and the damper velocity of the suspension in a situation where the pitch rate and the roll rate occur are determined, the damper-relative-velocity estimation module combines damper velocities of respective suspensions of the vehicle to tune the damper velocity of the suspension.

16. The damper control system according to claim 15, wherein the damper-relative-velocity estimation module tunes the damper velocity of the suspension in the situation where the pitch rate occurs and the damper velocity of the suspension in the situation where the pitch rate and the roll rate occur, using the following equation, $$\varepsilon \times (\text{suspension in the situation where pitch rate occurs}) + (1-\varepsilon) \times (\text{damper velocity of suspension in the situation where pitch rate and roll rate occur}) = \text{damper velocity of final suspension}$$

where $\varepsilon$ represents a tuning variable.

* * * * *